(12) United States Patent
Su et al.

(10) Patent No.: US 10,192,514 B2
(45) Date of Patent: Jan. 29, 2019

(54) DISPLAY DEVICE

(71) Applicants: Qisda (Suzhou) Co., Ltd., Suzhou, Jiangsu (CN); Qisda Corporation, Taoyuan (TW)

(72) Inventors: Yung-Chun Su, New Taipei (TW); Hung-Mao Chen, Taoyuan (TW)

(73) Assignees: Qisda (Suzhou) Co., Ltd., Suzhou (CN); Qisda Corporation, Taoyuan (TW)

( * ) Notice: Subject to any disclaimer, the term of this patent is extended or adjusted under 35 U.S.C. 154(b) by 230 days.

(21) Appl. No.: 15/208,579

(22) Filed: Jul. 12, 2016

(65) Prior Publication Data

US 2017/0025054 A1    Jan. 26, 2017

(30) Foreign Application Priority Data

Jul. 23, 2015  (CN) .......................... 2015 1 0438231

(51) Int. Cl.
*G06F 1/16*    (2006.01)
*G09G 5/00*    (2006.01)
*G09G 5/02*    (2006.01)

(52) U.S. Cl.
CPC ............. *G09G 5/00* (2013.01); *G06F 1/1601* (2013.01); *G06F 1/1607* (2013.01); *G09G 5/02* (2013.01); *G09G 2320/0666* (2013.01); *G09G 2320/0693* (2013.01); *G09G 2330/12* (2013.01); *G09G 2360/145* (2013.01)

(58) Field of Classification Search
None
See application file for complete search history.

(56) References Cited

U.S. PATENT DOCUMENTS

| | | | | |
|---|---|---|---|---|
| 1,898,219 | A * | 2/1933 | Sharp | G01J 3/51 250/226 |
| 3,519,776 | A * | 7/1970 | Slater | H01H 23/20 200/275 |
| 6,459,485 | B1 * | 10/2002 | Tsurutani | G01M 11/00 348/180 |
| 7,345,669 | B2 * | 3/2008 | Ohashi | G02F 1/1309 340/501 |
| 7,372,571 | B2 * | 5/2008 | Lianza | G01J 3/02 250/214 B |
| 7,728,845 | B2 | 6/2010 | Holub | |
| 8,582,034 | B2 | 11/2013 | Kwong | |
| 8,743,101 | B2 * | 6/2014 | Kaji | G02F 1/13318 345/207 |

(Continued)

FOREIGN PATENT DOCUMENTS

| CN | 201673653 | 12/2010 |
|---|---|---|
| CN | 202864940 | 4/2013 |

(Continued)

*Primary Examiner* — Xanthia C Cunningham

(57) ABSTRACT

A display device includes a display panel and a color calibration module. The display panel includes a display screen. The color calibration module includes a pivot end and a calibration end opposite to the pivot end. When the color calibration module rotates about the pivot end, the calibration end moves from a first position to a second position along a route unparallel to the display screen. A distance between the second position and the display screen is shorter than a distance between the first position and the display screen.

20 Claims, 8 Drawing Sheets

(56) References Cited

U.S. PATENT DOCUMENTS

| | | | | |
|---|---|---|---|---|
| 9,530,340 B2* | 12/2016 | Lee | ........................ | G09G 3/006 |
| 2005/0190136 A1* | 9/2005 | Edelbrock | ............ | G09G 3/2003 |
| | | | | 345/88 |
| 2007/0024576 A1* | 2/2007 | Hassan | ................. | G06F 1/1632 |
| | | | | 345/156 |
| 2008/0204437 A1 | 8/2008 | Jensen | | |
| 2008/0250858 A1* | 10/2008 | Park | ......................... | G01J 3/02 |
| | | | | 73/431 |
| 2008/0294298 A1* | 11/2008 | Park | ......................... | G01J 3/02 |
| | | | | 700/302 |
| 2009/0009501 A1* | 1/2009 | Shiba | ........................ | G01J 1/02 |
| | | | | 345/207 |
| 2013/0214141 A1* | 8/2013 | Hogo | .................... | G01J 1/0403 |
| | | | | 250/234 |
| 2014/0091210 A1* | 4/2014 | Hogo | .................... | G06F 1/1601 |
| | | | | 250/216 |
| 2014/0176444 A1* | 6/2014 | Sultenfuss | ............ | G06F 1/1637 |
| | | | | 345/168 |
| 2015/0228213 A1* | 8/2015 | Cho | ........................ | G09G 3/006 |
| | | | | 345/690 |
| 2017/0025054 A1* | 1/2017 | Su | ......................... | G06F 1/1601 |

FOREIGN PATENT DOCUMENTS

| | | |
|---|---|---|
| JP | 2009014699 | 1/2009 |
| JP | 4734555 | 7/2011 |
| JP | 2012150136 | 8/2012 |

* cited by examiner

DISPLAY DEVICE

FIELD OF THE INVENTION

The invention relates to a display device, and more particularly to a display device with color calibration function.

BACKGROUND OF THE INVENTION

Currently available display devices are seldom equipped with color calibration function. In general, it is often necessary to purchase an additional external color calibration module for synchronization and normalization of display color.

However, consumers not only have to spend an additional budget on the color calibration module, installation of such color calibration module onto the display device is also inconvenient. If the color calibration module is not correctly installed, environmental lights may interfere the sensor of the color calibration module, causing undesirable reads and therefore reducing the calibration precision of the display device.

SUMMARY OF THE INVENTION

The present invention discloses a display device with color calibration function. The color calibration module of the present invention is attached to the display device, and may be toggle-released to a position for calibration. Additionally, the color calibration module of the present invention captures less environmental lights and thus calibrates more precisely.

According to an embodiment of the present invention, a display device includes a display panel and a color calibration module. The display panel includes a display screen. The color calibration module includes a pivot end and a calibration end opposite to the pivot end. When the color calibration module rotates about the pivot end, the calibration portion moves from a first position to a second position along a route unparallel to the display screen. A distance between the second position and the display screen is shorter than a distance between the first position and the display screen.

According to another embodiment of the present invention, a display device includes a display panel, a frame, a color calibration module, a first elastic member and a toggle switch. The display panel includes a display screen. The frame is configured for accommodating the display panel and exposing the display screen. The color calibration module includes a pivot end and a calibration end opposite to the pivot end, and is configured for rotating about a first axis perpendicular to the display screen. The first elastic member connects to the frame and the color calibration module, and is configured for providing an ejection force to the color calibration module. The toggle switch is disposed on the frame, and restrains the color calibration module to dispose the calibration end at a first position. When the toggle switch releases the color calibration module, the ejection force ejects the color calibration module and the color calibration module rotates about the pivot end. Once the color calibration module stops rotating, the calibration end is at a second position disposed in front of the display screen.

The present invention will be appreciated more specifically by referring to the following preferred embodiments, accompanying the illustrated drawings.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

Figure 1A:
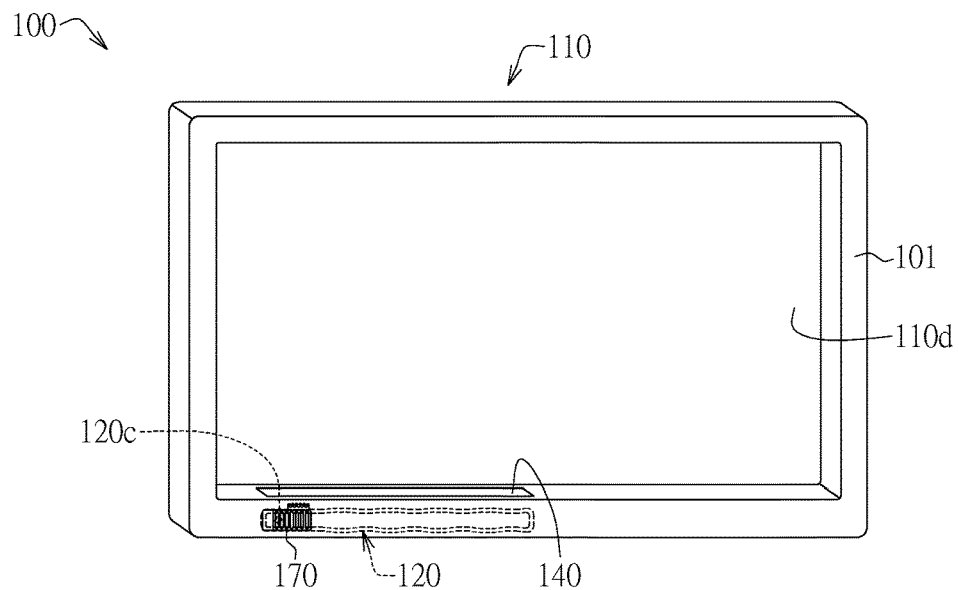
FIG. 1A is a schematic illustration depicting a retracted color calibration module of the display device according to an embodiment of the present invention.

A display device with color calibration function is provided in the present invention. The present invention will now be described more specifically by referring to the following embodiments. However, it is to be noted that the following descriptions of preferred embodiments of this invention, such as detailed structures, sizes and positions of relative devices and spatial relationships thereof, are presented herein for purpose of illustration and description only. Scope to be protected by the present invention is not intended to be exhaustive or to be limited to the precise form disclosed. Therefore, it is to be understood that the disclosure needs not be limited to the disclosed embodiment. On the contrary, it is intended to cover various modifications and similar arrangements included within the spirit and scope of the appended claims, which are to be accorded with the broadest interpretation so as to encompass all such modifications and similar structures. Further, scales of drawings are not consistent to sizes of concrete product; that is, it should be appreciated that the terms of drawings are illustrative, instead of any intention to limit the present invention to these terms. Moreover, for the sake of convenience in description, the same or similar reference numerals are used to indicate the same or similar components in this specification.

Figure 1B:
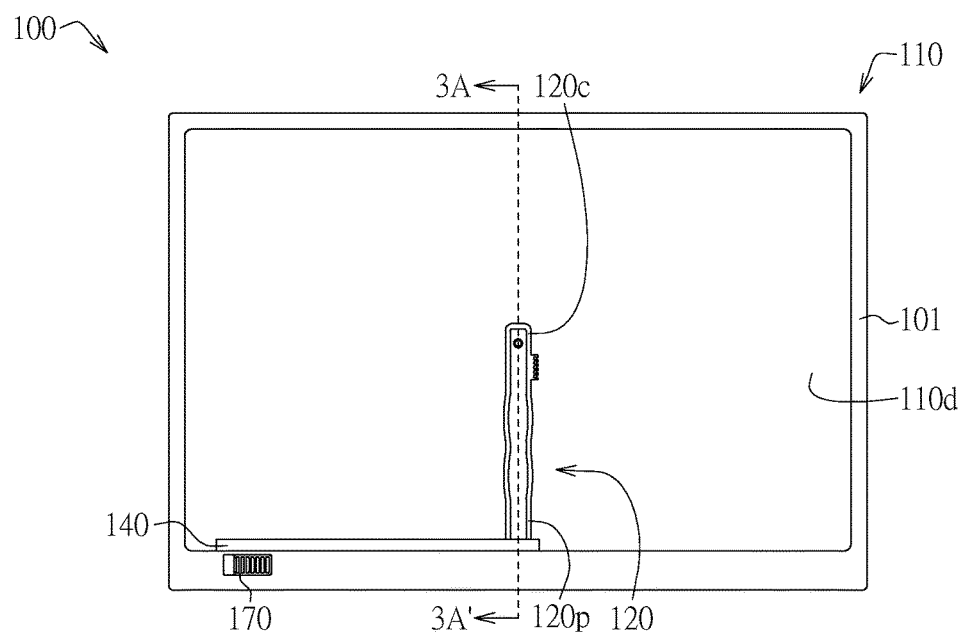
FIG. 1B is a schematic illustration depicting an exposed color calibration module of the display device according to the embodiment of the present invention.

FIG. 1A illustrates a color calibration module 120 of a display device 100 of an embodiment of the present invention accommodating within a frame 101 of the display device 100; that is, a calibration end 120c of the color calibration module 120 is disposed at a first position. FIG. 1B illustrates the color calibration module 120 of the display device 100 disposing in front of a display screen; that is, the calibration end 120c is disposed at a second position).

As shown in FIG. 1A, the color calibration module 120 may be accommodated within the frame 101 of the display device 100 when unused, so that the color calibration module 120 would not block viewing of the display screen 110d. Once color deterioration of the display screen 110d occurs, a user may then use the color calibration module 120 for color calibration. In the embodiment shown in FIG. 1B, a toggle switch 170 disposed on the frame 101 may be used for releasing the color calibration module 120, so that the color calibration module 120 would rotate about a pivot end 120p. For example, once the toggle switch 170 is pressed, a calibration end 120c disposed at the first position (i.e. located within the frame as shown in FIG. 1A) would rotate for 90 degrees and arrives at the second position, as shown in FIG. 1B. When the calibration end 120c is at the second position (i.e. located in front of the display screen), the calibration end 120c may perform color calibration for the display screen 110d. In other embodiments, the color calibration module 120 may be electrically controlled to rotate and move to the front of the display screen 110d.

The display device 100 of the present invention may be a display device with color calibration function, and may display color according to calibration values obtained from data collected and processed by the color calibration module 120. In the present embodiment, the display device 100 includes a display panel 110 and the color calibration module 120. The color calibration module 120 may move to the front of the display screen 110d along a route unparallel to the display screen 110d for color calibration. In this way, the calibration end 120c may be positioned even closer to the display screen 110d, thus reducing or avoiding capturing of undesirable environmental lights.

Figure 2A:
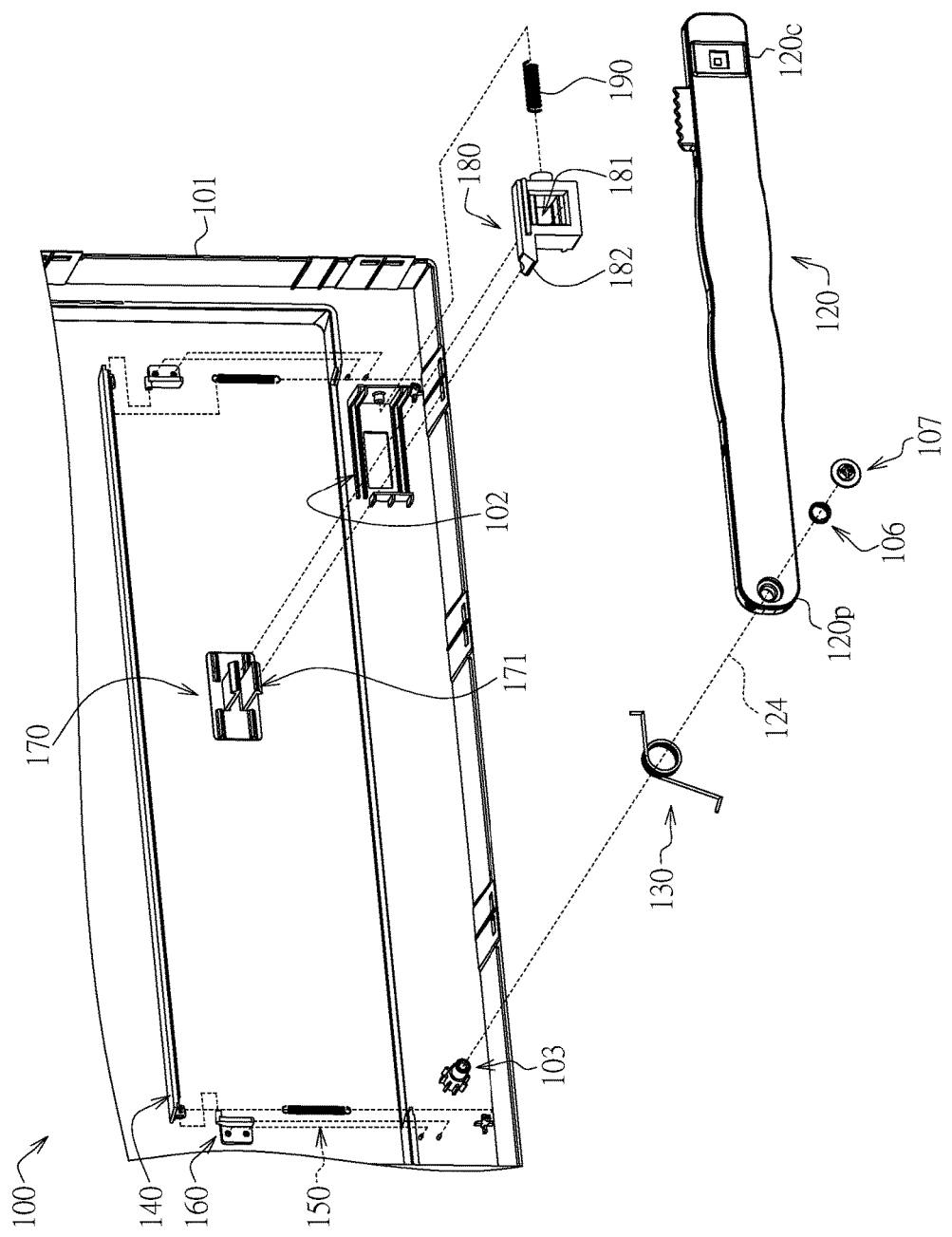
FIG. 2A depicts an exploded view of the display device of FIGS. 1A and 1B.

FIG. 2A illustrates an exploded view of the display device 100. The display device 100 includes the frame 101, the color calibration module 120, a first elastic member 130 and the toggle switch 170. The color calibration module 120 includes the pivot end 120p and the calibration end 120c opposite to the pivot end 120p. The first elastic member 130 connects to an inner surface of the frame 101 and the color calibration module 120 and is configured for providing an ejection force to the color calibration module 120a, so that the color calibration module 120 may eject and rotate about the pivot end 120p. In this embodiment, the first elastic member 130 is a torsional spring; however, volute spring or other types of elastic component may also be used.

According to this embodiment, the toggle switch 170 provides a restraining force that is greater than the ejection force of the first elastic member 130, so that the color calibration module 120 is restrained from ejecting outward and the calibration end 120c is maintained at the first position.

The display device 100 of the present embodiment may further includes a flip cover plate 140, a second elastic member 150 and a flap 160. The flip cover plate 140 functions to proof dusts and beautify the appearance of the device. In other embodiments, the flip cover plate 140, the second elastic member 150 and the flap 160 may be omitted without affecting the functioning of the color calibration module 120.

Referring now to FIG. 2A. The flap 160 is attached to the frame 101 by, for example, hot-melt adhesives or screwing. The flip cover plate 140 is pivotally connected to the frame 101 via the flap 160; nevertheless, the flap 160 may be omitted, and the flip cover plate 140 may be pivotally connected to the frame 101 directly.

According to this embodiment, the second elastic member 150 is, for example, a tension spring. The second elastic member 150 is connected to the flip cover plate 140 and the frame 101, and is configured for providing a retention force to the flip cover plate 140. The retention force provided by the second elastic member 150 allows the flip cover plate 140 to maintain closed. As shown in FIG. 1A, if the retention force is not overcome or counterbalanced (for example, when calibration end 120c is at the first position), the flip cover plate 140 would stay closed. In this embodiment, the ejection force provided by the first elastic member 130 is greater than the retention force provided by the second elastic member 150. Therefore, once the toggle switch 170 releases the color calibration module 120, the ejection force of the first elastic member 130 overcomes the retention force of the second elastic member 150 and ejects the color calibration module 120, thus enabling the color calibration module 120 to rotate about the pivot end 120p. During the rotation, the calibration end 120c pushes against the flip cover plate 140, causing the flip cover plate 140 to open. The flip cover plate 140 would then stay open as the flip cover plate 140 is restrained by the color calibration module 120, as shown in FIG. 1B.

Referring again to FIG. 2A. The display device 100 of the present embodiment may further include a stopper 180 and a third elastic member 190. In addition, the frame 101 may further include a rail 102, on which the toggle switch 170 and the stopper 180 may be slidably mounted. The toggle switch 170 is attached to the stopper 180, and the two may move simultaneously along the rail 102, so that the stopper 180 may optionally restrain or release the color calibration module 120.

Specifically, the stopper 180 is disposed on an inner surface of the frame 101. The stopper 180 includes an opening 181 and a restraining portion 182. The toggle switch 170 is disposed on an outer surface of the frame 101, and includes a buckle 171. The buckle 171 penetrates the outer surface of the frame 101 and the opening 181, and fastens with the stopper 180. The third elastic member 190 connects to the stopper 180 and the frame 101, so that the third elastic member 190 deforms and generates an elastic potential when the stopper 180 slides with respect to the frame 101. Upon releasing of the toggle switch 170, the third elastic member 190 releases the elastic potential to recover the stopper 180 to its original position. In this embodiment, the third elastic member 190 is, for example, a compression spring.

Referring again to FIG. 2A. According to this embodiment, the display device 100 may further include a pivot shaft 103. The pivot shaft 103 is disposed within the frame 101, and the pivot end 120p is pivotally connected to the pivot shaft 103, therefore allowing the color calibration module 120 to rotate about a first axis 124.

Figure 2B:
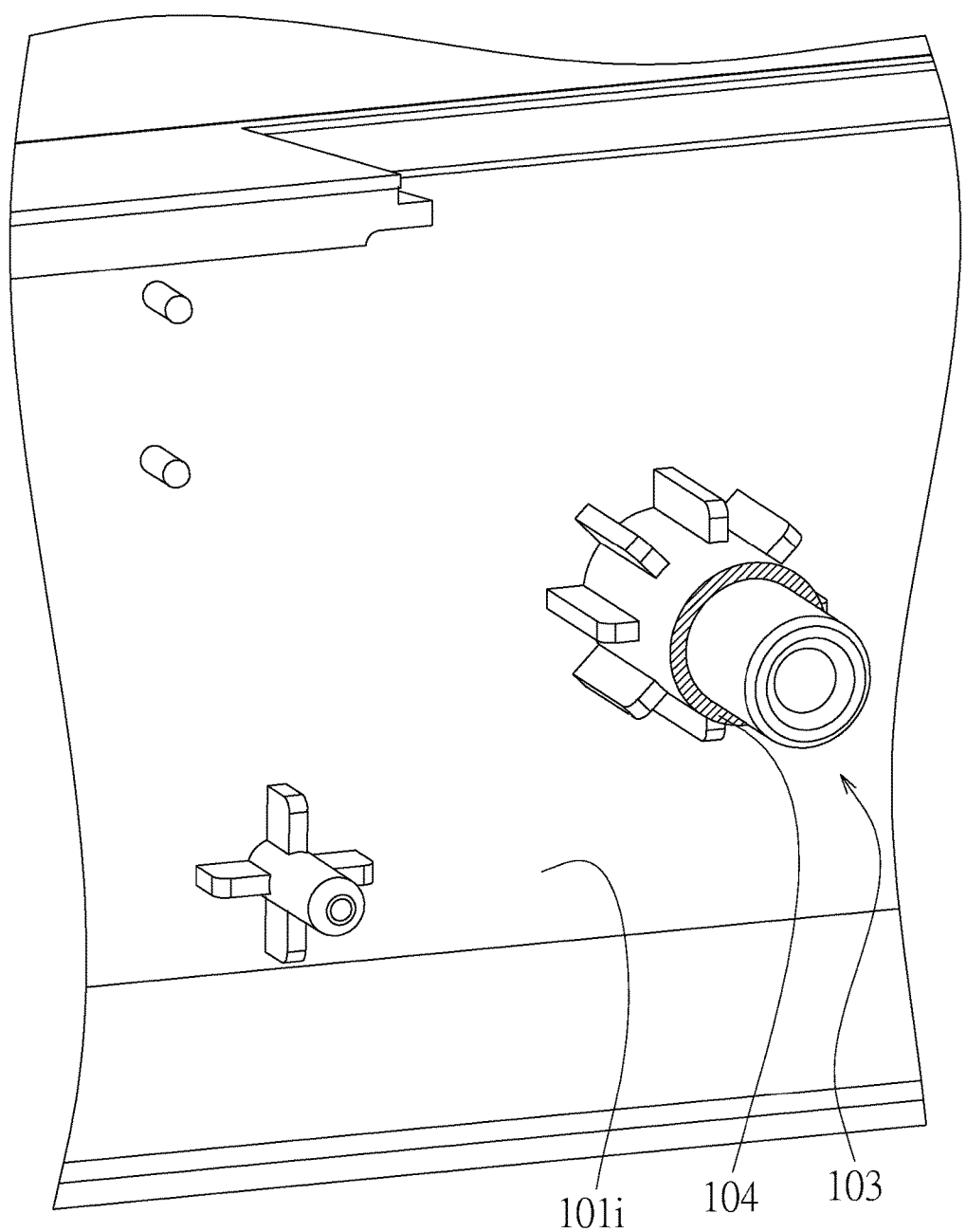
FIG. 2B depicts a partial enlarged view of the frame of FIG. 2A.

FIG. 2B illustrates a partial enlarged view of the frame 101 of FIG. 2A to demonstrate the structure of the pivot shaft 103. As shown in FIG. 2B, the pivot shaft 103 includes a slant surface 104 (highlighted by oblique lines) disposed around the pivot shaft 103. The distance between the color calibration module 120 and the inner surface 101i varies continuously when the color calibration module 120 rotates along the slant surface 104. When the calibration end 120c moves from the first position to the second position, the pivot end 120p abuts against and rotates along the slant surface 104, and the calibration end 120c moves from a position farther from the display screen 110d to a position closer thereto. Therefore, the color calibration module 120 would move along a route unparallel to the display screen 110d.

Figure 3A:
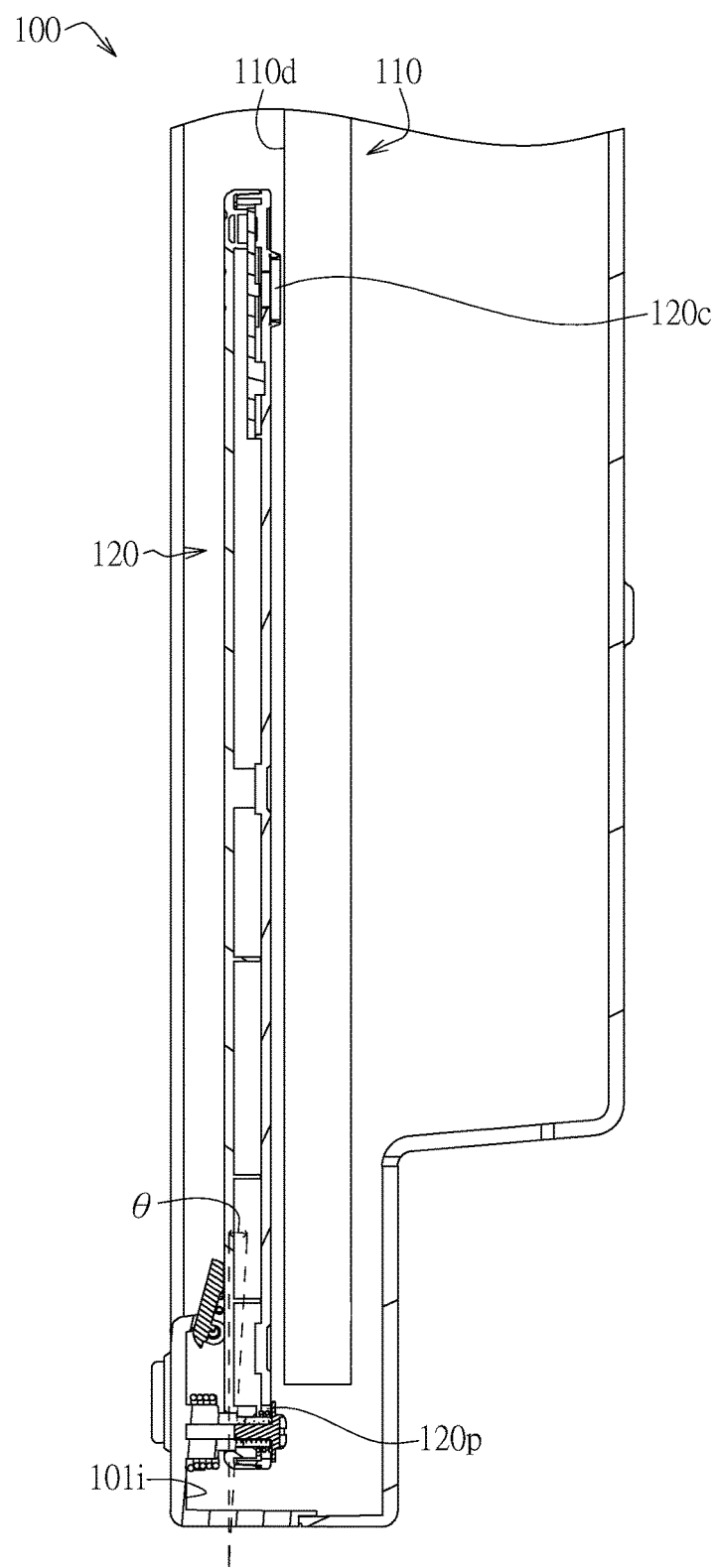
FIG. 3A is a cross-sectional view of the display device of FIG. 1B along line 3A-3A'.
Figure 3B:
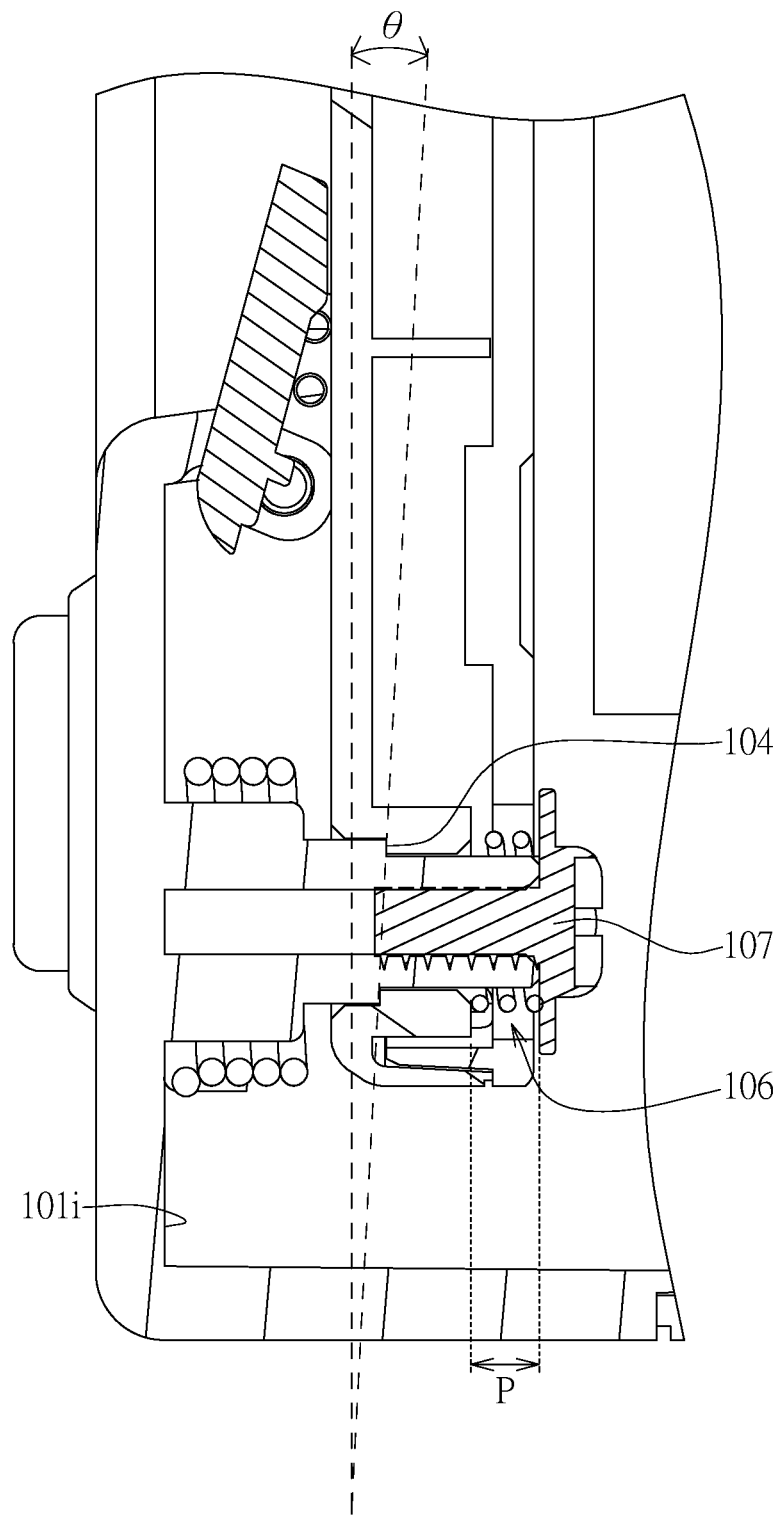
FIG. 3B depicts an enlarged view of the pivot end.

Referring now to FIGS. 3A and 3B. FIG. 3A is a cross-sectional view of the display device of FIG. 1B along line 3A-3A', and FIG. 3B illustrates an enlarged view of the pivot end 120p. The pivot shaft 103 includes the slant surface 104 disposed around the pivot shaft 103, and the distance between the color calibration module 120 and the inner surface 101*i* varies continuously when the color calibration module 120 rotates along the slant surface 104. As shown in FIGS. 3A and 3B, the slant surface 104 has in a tilt angle θ along the direction of the pivot end 120*p* toward the calibration end 120*c*. When the color calibration module 120 moves from the first position to the second position, the slant surface 104 guides the calibration end 120*c* of the color calibration module 120 to lean toward the display screen 110*d*. In this way, the color calibration module 120 would become unparallel to the display screen 110*d* and that the calibration end 120*c* would be positioned even closer to the display screen 110*d* than the default second position. As a result, the distance between the calibration end 120*c* and the display screen 110*d* is reduced, thus minimizing or avoiding capturing of undesirable environmental lights to obtain a more precise calibration value.

Referring again to FIGS. 2A and 3B. According to this embodiment, in order to reduce the rotational speed of the calibration end 120*c* from the first position to the second position, the display device 100 may further includes a fourth elastic member 106. When assembling the display device 100, the first elastic member 130, the pivot end 120*p* of the color calibration module 120 and the fourth elastic member 106 may be sequentially disposed on the pivot shaft 103. Thereafter, a fastening component 107 (for example, a screw) may be employed to fasten the first elastic member 130, the pivot end 120*p* of the color calibration module 120 and the fourth elastic member 106 onto the pivot shaft 103. In this embodiment, the fourth elastic member 106 may be a compression spring. When the calibration end 120*c* moves from the first position to the second position, the fourth elastic member 106 provides a gap P between the color calibration module 120 and the fastening component 107. This allows the pivot end 120*p* to rotate at a steady speed toward the second position and preventing collision of the pivot end 120*p* with the fastening component 107 due to invalid rotation on a first axis 124 when the slant surface 104 guides the calibration end 120*c* to move toward the display screen 110*d*. According to another embodiment, a deceleration gear connecting to the pivot end 120*p* may be adopted to control the rotational speed of the pivot end 120*p*.

Moreover, other guiding mechanisms may also be utilized to move the color calibration module 120 toward the front of the display screen along a route unparallel to the display screen 110*d*.

Figure 4:
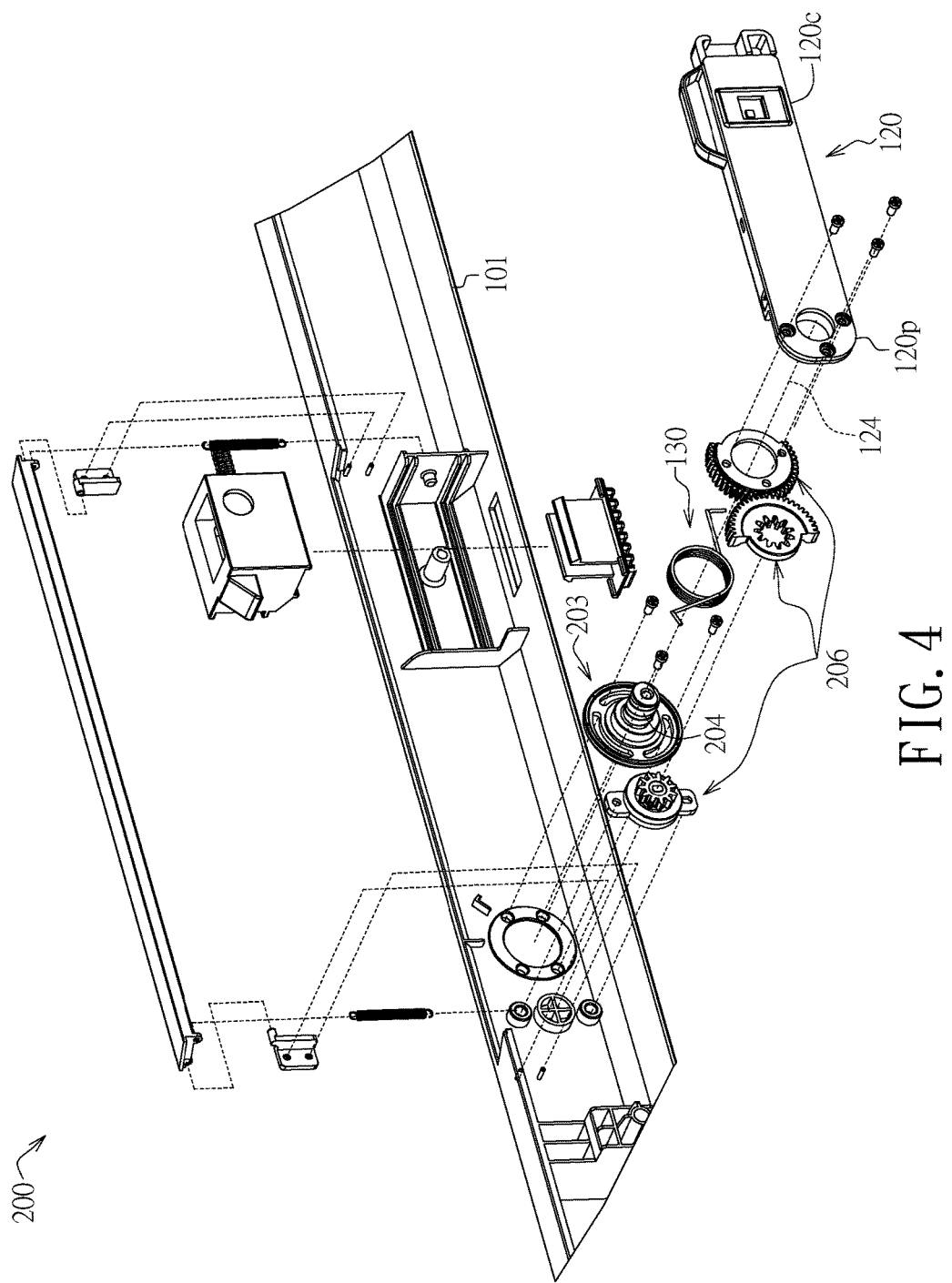
FIG. 4 depicts an exploded view of the display device according to another embodiment of the present invention.

Referring now to FIG. 4, which illustrates an exploded view of a display device 200 according to another embodiment of the present invention. According to this embodiment, the display device 200 may further include a screw rod 203 disposed within the frame 101. The pivot end 120*p* is screw-connected to the screw rod 203, so that the color calibration module 120 may rotate about a first axis 124 along the screw rod 203.

In this embodiment, as the screw rod 203 has screw thread 204 thereon, the pivot end 120*p* would rotate along with the screw thread 204 when the calibration end 120*c* moves from the first position to the second position. As shown in FIG. 3B, since the screw thread 204 extends forward at the tilt angle θ, the screw thread 204 would guide the calibration end 120*c* of the color calibration module 120 to lean toward the display screen when the calibration end 120*c* moves from the first position to the second position. Therefore, when the calibration end 120*c* is at the second position, the color calibration module 120 would become unparallel to the display screen and the calibration end 120*c* would be positioned even closer to the display screen than the pivot end 120*p* is. As a result, the distance between the calibration end 120*c* and the display screen is shorter at the second position than at the first position, therefore minimizing or avoiding capturing of undesirable environmental lights to obtain a more precise calibration value.

Furthermore, in order to reduce the rotational speed of the color calibration module 120 when the calibration end 120*c* moves from the first position to the second position, the display device 200 may further includes a decelerating mechanism 206; for example, a deceleration gear set. The decelerating mechanism 206 may be connected to the pivot end 120*p* to control the rotational speed of the pivot end 120*p* from the first position to the second position.

Next, the structure of the color calibration module 120 is described as follows.

Figure 5:
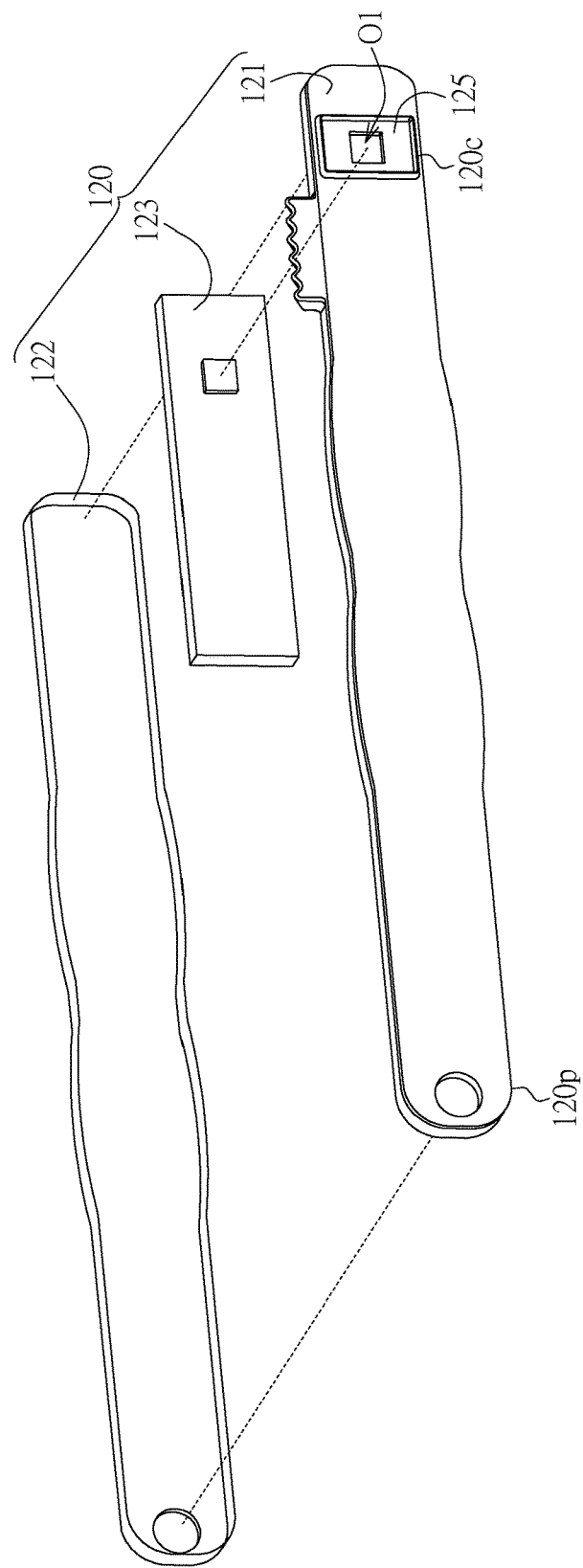
FIG. 5 depicts an exploded view of the color calibration module according to the other embodiment of the present invention.

Referring now to FIG. 5, which illustrates an exploded view of color calibration module 120 according to an embodiment of the present invention. The color calibration module 120 includes a first cover plate 121, a second cover plate 122 and a sensor 123. The sensor 123 is disposed between the first cover plate 121 and the second cover plate 122. A fastening component (for example, a screw) may be employed to fasten the first cover plate 121, the sensor 123 and the second cover plate 122. Moreover, the calibration end 120*c* of the color calibration module 120 may include an opening O1 for exposing the sensor 123 therefrom, so that the sensor 123 may detect display values of the display screen.

Furthermore, the color calibration module 120 may further includes a flexible structure 125, for example, a foam structure. The flexible structure 125 protrudes over the first cover plate 121 and surrounds the opening O1. When the calibration end 120*c* moves to the second position, the flexible structure 125 would not touch the display screen, except when temporary movement or vibration occurs. With the flexible structure 125 being disposed between the calibration end 120*c* and the display screen, the flexible structure 125 provides a cushion, so that scratching of the display screen by the calibration end 120*c* may be prevented when unexpectedly collision occurs between the calibration end 120*c* and the display screen. Moreover, the flexible structure 125 also provides light shielding functions.

On the other hand, according to another embodiment of the present invention, the color calibration module 120 may also include the following structure.

Figure 6:
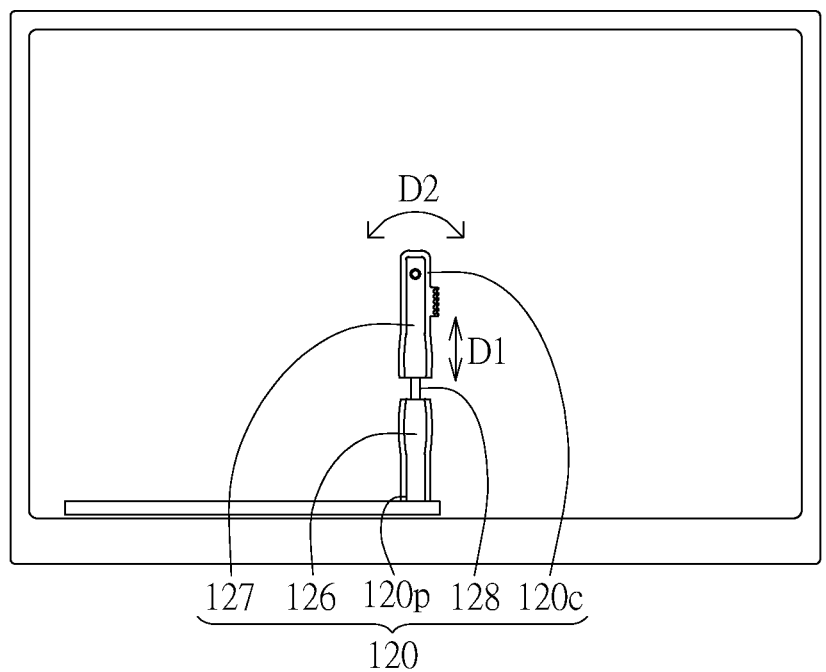
FIG. 6 depicts the structure of the color calibration module according to yet another embodiment of the present invention.

Referring now to FIG. 6, which illustrates the structure of the color calibration module 120 according to another embodiment of the present invention. The color calibration module 120 includes a first body 126 and a second body 127. The first body 126 and the second body 127 are coupled to each other via a joint portion 128 disposed therebetween. More specifically, one end of the first body 126 is disposed at the pivot end 120*p*, the other end of the first body 126 is connected to the second body 127 via the joint portion 128; and the calibration end 120*c* is disposed at the other side of the second body 127 that is opposite to the joint portion 128. When calibration end 120*c* is at the second position as shown in FIG. 6, the second body 127 is movable with respect to the first body 126, therefore allowing the calibration end 120*c* to move off from the second position.

In this embodiment, the joint portion 128 may be of a sleeve structure; when the calibration end 120*c* is at the second position, the second body 127 may optionally extend or retract along the first direction D1 with respect to the first body 126. In other embodiments, the joint portion 128 may be of a pivot shaft structure; when calibration end 120*c* is at the second position, the second body 127 may rotate with respect to the first body 126, for example, along the second direction D2. Alternatively, the joint portion 128 may include both the pivot shaft structure and the sleeve structure. Such structures would allow the calibration end 120c to detect values at most of the display screen.

It is to be understood that while the color calibration module is accommodatable within the frame of the display device according to the above-mentioned embodiments, the invention is not limited thereto. The color calibration module may be an external module attachable onto the display screen of the display device, or an attaching module directly secured onto the display screen of the display device for color calibration. Color calibration modules that are unparallel to the display screen and the calibration end thereon is positioned closer to the display screen than the pivot end is when the calibration end is at the second position in front of the display screen all fall within the scope of protection of the present invention.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A display device, comprising:
    a display panel comprising a display screen;
    a color calibration module comprising a pivot end and a calibration end opposite to the pivot end, and
    a sensor disposed on the calibration end,
    wherein when the color calibration module rotates about the pivot end, the calibration end moves from a first position to a second position along a route unparallel to the display screen, and a distance between the second position and the display screen is shorter than a distance between the first position and the display screen, and
    during the color calibration module rotates, a distance between the sensor and the pivot end is constant.

2. The display device according to claim 1, further comprising:
    a frame configured for accommodating the display panel and exposing the display screen,
    wherein when the calibration end is disposed at the first position, the color calibration module is accommodated within the frame.

3. The display device according to claim 2, further comprising:
    a flip cover plate pivotally connected to the frame;
    a first elastic member connected to the frame and the color calibration module and configured for providing an ejection force to the color calibration module; and
    a second elastic member connected to the flip cover plate and the frame and configured for providing a retention force to the flip cover plate,
    wherein the ejection force is greater than the retention force.

4. The display device according to claim 3, further comprising:
    a toggle switch disposed outside of the frame;
    a stopper disposed within the frame and connected to the toggle switch; and
    a third elastic member connected to the stopper and the frame,
    wherein the stopper restrains or releases the color calibration module.

5. The display device according to claim 1, wherein the color calibration module comprises a first cover plate and a second cover plate, the sensor is disposed between the first cover plate and the second cover plate, the first cover plate is closer to the display screen than the second cover plate is, and the first cover plate comprises an opening for exposing the sensor.

6. The display device according to claim 5, wherein the color calibration module further comprises a flexible structure, the flexible structure protrudes over the first cover plate for providing a cushion against a collision between the color calibration module and the display screen when the calibration end moves to the second position.

7. The display device according to claim 1, wherein the color calibration module comprises a first body and a second body, a first end of the first body is disposed at the pivot end, a second end of the first body is connected to a first end of the second body via a joint portion, the calibration end is disposed at a second end of the second body, and the second body is movable with respect to the first body when the calibration end is at the second position, thus allowing the calibration end to move off from the second position.

8. The display device according to claim 7, wherein the joint portion is of a pivot shaft structure, and the second body is rotatable with respect to the first body.

9. The display device according to claim 7, wherein the joint portion is of a sleeve structure, and the second body is extendable and retractable with respect to the first body.

10. A display device, comprising:
    a display panel comprising a display screen;
    a frame configured for accommodating the display panel and exposing the display screen;
    a color calibration module comprising a pivot end and a calibration end opposite to the pivot end and configured for rotating about a first axis perpendicular to the display screen;
    a first elastic member connected to the frame and the color calibration module and configured for providing an ejection force to the color calibration module;
    a toggle switch disposed on the frame, wherein the toggle switch restrains the color calibration module to dispose the calibration end at a first position, when the toggle switch releases the color calibration module, the ejection force ejects the color calibration module and the color calibration module rotates about the pivot end, and once the color calibration module stops rotating, the calibration end is at a second position disposed in front of the display screen; and
    a sensor disposed on the calibration end,
    wherein during the color calibration module rotates, a distance between the sensor and the pivot end is constant.

11. The display device according to claim 10, wherein when the color calibration module rotates about the pivot end, the calibration end moves from the first position to the second position along a route unparallel to the display screen, and a distance between the second position and the display screen is shorter than a distance between the first position and the display screen.

12. The display device according to claim 10, wherein when the calibration end is disposed at the first position, the color calibration module is accommodated within the frame.

13. The display device according to claim 10, wherein the color calibration module comprises a first cover plate, a second cover plate and a sensor, the sensor is disposed between the first cover plate and the second cover plate, the first cover plate is closer to the display screen than the second cover plate is, and the first cover plate comprises an opening for exposing the sensor.

14. The display device according to claim 13, wherein the color calibration module further comprises a flexible structure, the flexible structure protrudes over the first cover plate for providing a cushion against a collision between the color calibration module and the display screen when the calibration end moves to the second position.

15. The display device according to claim 13, further comprising:
a flip cover plate pivotally connected to the frame; and
a second elastic member connected to the flip cover plate and the frame and configured for providing a retention force to the flip cover plate,
wherein the ejection force is greater than the retention force.

16. The display device according to claim 15, further comprising:
a stopper disposed within the frame and connected to the toggle switch; and
a third elastic member connected to the stopper and the frame,
wherein the stopper restrains or releases the color calibration module.

17. The display device according to claim 10, further comprising:
a pivot shaft, disposed within the frame, the pivot end being pivotally connected to the pivot shaft,
wherein the pivot shaft comprises a slant surface for the pivot end to rotate along when the calibration end moves from the first position to the second position.

18. The display device according to claim 10, wherein the color calibration module comprises a first body and a second body, a first end of the first body is disposed at the pivot end, a second end of the first body is connected to a first end of the second body via a joint portion, the calibration end is disposed at a second end of the second body, and the second body is movable with respect to the first body when the calibration end is at the second position, thus allowing the calibration end to move off from the second position.

19. The display device according to claim 18, wherein the joint portion is of a sleeve structure, and the second body is extendable and retractable with respect to the first body.

20. A display device, comprising:
a display panel comprising a display screen;
a frame configured for accommodating the display panel and exposing the display screen;
a color calibration module comprising a pivot end and a calibration end opposite to the pivot end and configured for rotating about a first axis perpendicular to the display screen;
a first elastic member connected to the frame and the color calibration module and configured for providing an ejection force to the color calibration module;
a toggle switch disposed on the frame, wherein the toggle switch restrains the color calibration module to dispose the calibration end at a first position, when the toggle switch releases the color calibration module, the ejection force ejects the color calibration module and the color calibration module rotates about the pivot end, and once the color calibration module stops rotating, the calibration end is at a second position disposed in front of the display screen; and
a screw rod disposed within the frame, the pivot end being screw-connected to the screw rod,
wherein the pivot end rotates along the screw rod when the calibration end moves from the first position to the second position.

* * * * *